No. 694,835. Patented Mar. 4, 1902.
A. COOK.
GUARD FOR WOODWORKING MACHINES.
(Application filed June 29, 1901.)
(No Model.)

Witnesses
Fred W. Englert
Percy L. Bowen

Inventor
Andrew Cook,
by Wilkinson & Fisher,
Attorneys.

UNITED STATES PATENT OFFICE.

ANDREW COOK, OF GLASGOW, SCOTLAND.

GUARD FOR WOODWORKING-MACHINES.

SPECIFICATION forming part of Letters Patent No. 694,835, dated March 4, 1902.

Original application filed March 12, 1901, Serial No. 50,824. Divided and this application filed June 29, 1901. Serial No. 66,554. (No model.)

*To all whom it may concern:*

Be it known that I, ANDREW COOK, a subject of the King of Great Britain, residing at Glasgow, in the county of Lanark, Scotland, have invented certain new and useful Improvements in Guards for Woodworking-Machines for Making Irregular, Circular, or Straight Moldings; and I do hereby declare the following to be a full, clear, and exact description of the invention, such as will enable others skilled in the art to which it appertains to make and use the same.

This invention relates to improvements in guards for woodworking-machines for making irregular, circular, or straight moldings having one or more vertical spindles carrying cutters and such like machines, and has for its object to obviate the accidents so common to the hands of the operator of such machines and at the same time to facilitate and increase production.

This application is a division of my former application, Serial No. 50,824, filed March 12, 1901.

Figure 1:
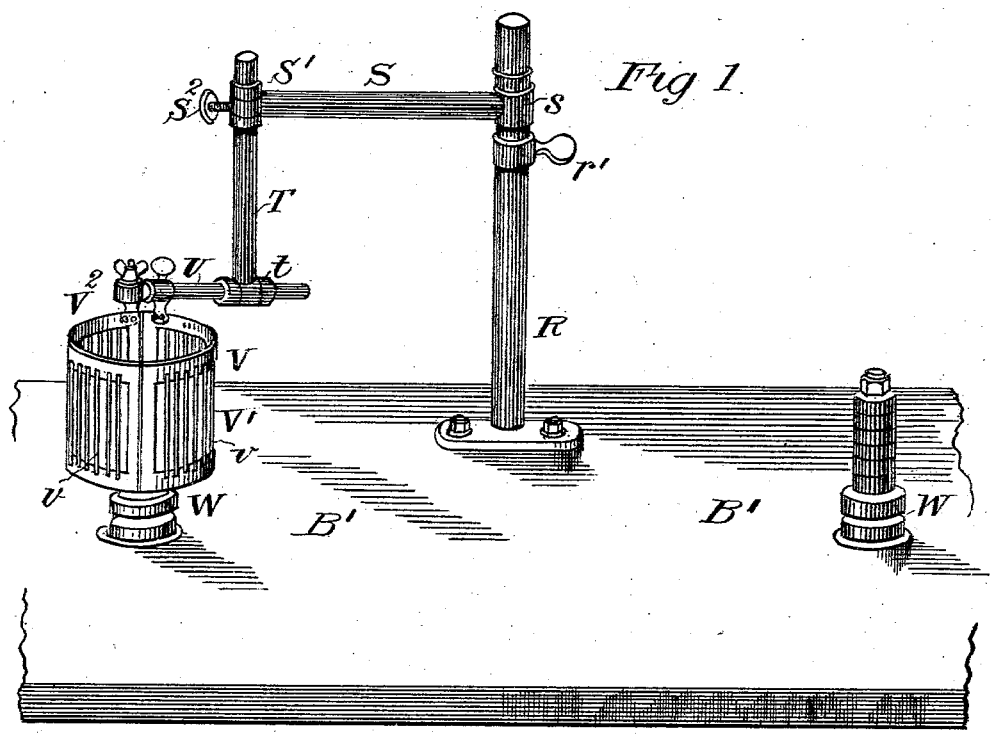
Figure 2:
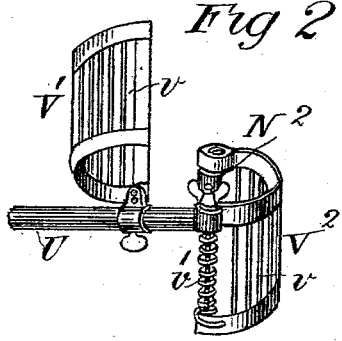
Figure 3:
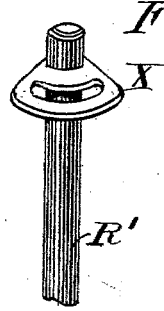

In the drawings, Figure 1 is a perspective view of a guard applied to a double-spindle machine for making irregular, circular, or straight moldings; and Fig. 2 is a detached view of the guard, showing one of its members turned up out of engagement. Fig. 3 illustrates a modified form of table pillar or standard mounted with a quadrant for giving the guard a radial swiveling action, all hereinafter more fully referred to.

In one of its simplest forms the part of my invention herein shown consists in bolting the pillar or standard R to the table of the machine B'. This pillar or standard has a slidable collar $r$, which is clamped to the pillar or standard R by the pinching-screw $r'$ or what may more conveniently be a bent hand-screw at any suitable elevation.

Slidably supported upon the collar $r$ is a bush or journal $s$, forming a movable part of a horizontal arm or rod S. This horizontal arm or rod S terminates at its outer end with a bush $s'$, similar to that already described, and is provided with a pinching-screw $s^2$. Passing vertically up through the bush $s'$ is a vertical arm or rod T, capable of being raised and lowered at will. The lower end of the arm or rod T terminates with a right-angle bush $t$, and passing through this bush or journal $t$ is a horizontal arm or rod U, which carries the guard proper, V. The guard is composed of two members V' and $V^2$ of semi-cylindrical form and section, whose cylindric faces are or may be more or less ribbed, perforated, slotted, and, as shown in the drawings, provided with wire bars $v$. The two semicylindric members V' and $V^2$ aforesaid when brought together, as shown in Fig. 1, constitute a perfect cylinder, and within this circular inclosure the spindle of the rotary cutters W revolves. The inner cylindrical member V' of the guard proper, V, aforesaid is slidably mounted on the horizontal rod U and is capable of being clamped in a more or less expanded position. By virtue of such arrangement the member V' can be turned up and clamped out of engagement of the rotary cutters which it is intended to guard, as seen in Fig. 2, or the outer member $V^2$ may be so treated by the axial movement of the rod U. It will therefore be seen that each member may be operated in a manner independent of the other, which is a feature of great utility when straight moldings are being cut. The radial or swivel movement afforded by the fixed pillar or standard R and the extensible properties of the before-mentioned component parts permit of the guard V being applied to either of the spindles of the double rotary cutting-table, as will be seen in and understood by Fig. 1. The swiveling motion may be obtained by the employment of a quadrant X, such as is shown in Fig. 3, arranged and mounted upon the pillar or standard R', which allows of a conveniently long reach of guard and its connections from point of fixture to that of the rotary cutters.

With further reference to the guard shown in Fig. 2 the outer cylindric member $V^2$ at a point of its pivotal connection to the horizontal arm U is provided with a spiral spring $v'$ or other impelling device mounted vertically, so as to cause the free and contact engaging surface, which it will be seen is provided with an antifriction-roller $N^2$, to always press inward and close the cylindric gap or breach when straight molds are being cut.

The antifriction-roller $N^2$, rubbing against the upright vertical side of the mold under treatment, exerts a continuous tension on the wood acted upon by the cutters and coming into instantaneous operation as a guard or shield when released from the wood. This form of guard constitutes a complete circle around the cutters, the lower cylindrical edges of which present a perfect zone and fence against accident to the workman, while at the same time they indicate the sphere or defined line of danger he is to avoid.

The guard in operation offers no obstruction to the machine to which it is employed.

In lieu of a collar and pinching-screw the fixed pillar or standard may be provided with a rising and falling collar and rear screw extension and male-screw clamping-handle, such as is shown and described in my previous patent of guards for circular saws, No. 640,095, granted to me December 26, 1899.

I claim—

1. In a device of the character described, the combination with a woodworking-machine, and rotary cutters carried thereby; of a standard supported upon said machine, an adjustable arm supported by said standard, and a divided cylindrical guard supported by said arm, and adapted to shield said cutters, substantially as described.

2. In a device of the character described, the combination with a woodworking-machine, and rotary cutters carried thereby; of a standard supported upon said machine, a rod swiveled to said standard, adapted to be adjusted vertically, an upright adjustably secured to said rod, a horizontal rod adjustably secured to said upright, and a guard adjustably secured to said horizontal rod, adapted to encircle said cutters, substantially as described.

3. In a device of the character described, the combination with a woodworking-machine, and rotary cutters carried thereby; of a standard supported upon said machine, an adjustable arm carried by said standard, and a pair of semicircular guards adjustably secured to said arm, and adapted to encircle said cutters, substantially as described.

4. In a device of the character described, the combination with a woodworking-machine, and rotary cutters carried thereby; of a standard mounted upon said machine, an arm adjustably secured upon said machine, a pair of semicircular guards carried by said arm adapted to encircle said cutters, one of said guards being swiveled to said arm, and the other guard hinged to said arm and provided with a spring and antifriction-roller for guiding the material fed to said cutters, substantially as described.

In testimony whereof I affix my signature in presence of two witnesses.

ANDREW COOK.

Witnesses:
FRED. H. McCOSH,
ROBT. HUTCHINSON.